(12) United States Patent
Schiffer et al.

(10) Patent No.: US 12,329,253 B2
(45) Date of Patent: Jun. 17, 2025

(54) JEWELRY RING HAVING A RFID TRANSPONDER AND A READING ARRANGEMENT

(71) Applicant: EGF—EDUARD G. FIDEL GMBH, Pforzheim (DE)

(72) Inventors: Stefan Schiffer, Eisingen (DE); Kai-F. Binder, Pforzheim (DE)

(73) Assignee: EGF—Eduard G Fidel GMBH, Pforzheim (DE)

( * ) Notice: Subject to any disclaimer, the term of this patent is extended or adjusted under 35 U.S.C. 154(b) by 143 days.

(21) Appl. No.: 18/006,498

(22) PCT Filed: Jan. 19, 2022

(86) PCT No.: PCT/EP2022/051076
§ 371 (c)(1),
(2) Date: Jan. 23, 2023

(87) PCT Pub. No.: WO2022/175005
PCT Pub. Date: Aug. 25, 2022

(65) Prior Publication Data
US 2023/0292889 A1    Sep. 21, 2023

(30) Foreign Application Priority Data
Feb. 17, 2021  (DE) ............... 20 2021 100 768.0

(51) Int. Cl.
*G06K 19/077* (2006.01)
*A44C 9/00* (2006.01)

(52) U.S. Cl.
CPC ...... *A44C 9/0053* (2013.01); *G06K 19/07762* (2013.01)

(58) Field of Classification Search
CPC .. A44C 9/0053; G06K 19/07762; G06K 7/10; G06F 3/04883; G06F 3/0346; H04W 4/008; G06Q 20/322
See application file for complete search history.

(56) References Cited

U.S. PATENT DOCUMENTS

| | | | |
|---|---|---|---|
| 2014/0260424 A1* | 9/2014 | Warren | A44C 17/0233 63/1.13 |
| 2017/0085688 A1* | 3/2017 | Zhou | H04B 5/77 |
| 2019/0053055 A1 | 2/2019 | Neyrou et al. | |
| 2023/0078994 A1* | 3/2023 | Lenttan | G06K 7/10 340/539.13 |

FOREIGN PATENT DOCUMENTS

| | | | |
|---|---|---|---|
| EP | 2597723 A1 | 5/2013 | |
| WO | 2018020055 A1 | 2/2018 | |

* cited by examiner

*Primary Examiner* — Vernal U Brown
(74) *Attorney, Agent, or Firm* — Colson Law Group, PLLC

(57) ABSTRACT

A jewelry ring, such as a jewelry finger ring which is worn in particular on the finger, has a metal base body, which forms a fitting receptacle, and a radio-frequency identification (i.e., "RFID") transponder in which readable data are stored and which has an antenna structure via which signals can be transmitted to a reading device. It is provided here that the RFID transponder is arranged on the inner side of the metal base body.

19 Claims, 2 Drawing Sheets

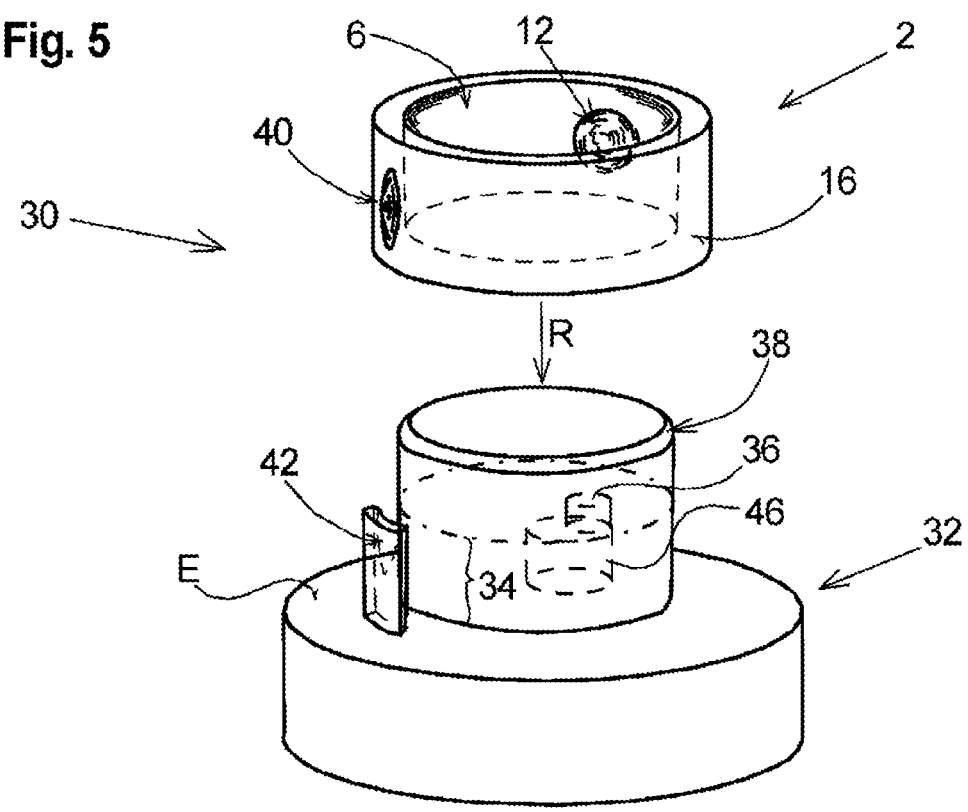
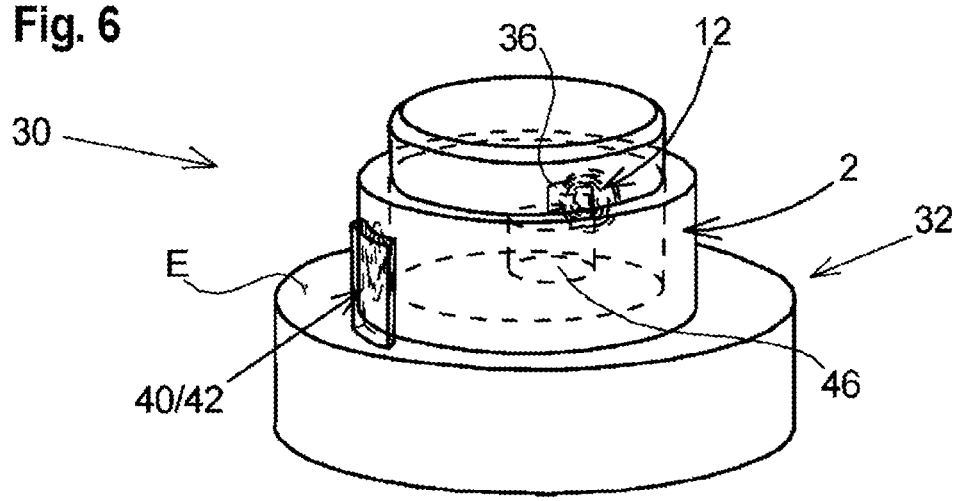

JEWELRY RING HAVING A RFID TRANSPONDER AND A READING ARRANGEMENT

FIELD

The invention relates to a jewelry ring, such as, for example, a jewelry finger ring or wedding ring, according to the preamble of claim 1. In this case, the jewelry ring has a metal base body, which is formed, for example, from precious metal, such as in particular a gold, silver and/or platinum alloy, and forms a fitting receptacle for fastening the jewelry ring on a finger of the wearer. In addition, a radio-frequency identification (hereinafter "RFID") transponder is provided on the jewelry ring in which readable data are stored, which are used, for example, to identify the user or which comprise access rights, for example for opening doors or for accessing computer systems. For this purpose, the RFID transponder is connected to an antenna structure or itself has an integrated antenna structure via which signals can be exchanged by a reading device.

BACKGROUND

EP2597723A1 discloses a jewelry ring on which an RFID transponder is accommodated in a recess of a metal base body which is let into an outer side. In this case, the RFID transponder is at least partially covered outwardly by an amorphous decorative element arranged on the metal base body.

WO 2018/020055 A1 describes a ring for near-field communication (NFC) via its outer side. For this purpose, the ring has an outer shell, on the inner side of which an annular seal can be inserted. An annular receptacle in which an NFC chip connected to an antenna structure is inserted is formed between the outer shell and the seal.

Such an arrangement of an RFID transponder enables a simple data transmission between a chip of the RFID transponder by an activation/reading device arranged outside the jewelry ring in order to store corresponding data on the chip and/or to be able to read already stored data. As a result, with the RFID transponder for example, a code for opening an electronic lock can be stored on a jewelry ring and read from the outside by a reading device. In this way, a jewelry ring worn on the finger can be held against a lock, such as a building or car door, in order to open it.

In addition to such uses of a piece of jewelry with an easily readable RFID transponder, there is a need on the market for jewelry rings, which ensure particularly secure storage of data or codes, such as codes that allow access to a bank account or to cryptocurrencies. Known jewelry rings are not suitable for such applications, since they are primarily designed for comfortable and simple opening of accesses, and the stored data must be relatively easy to read for this purpose. In this case, there is in particular the risk that by simply positioning a reading device against a piece of jewelry worn by a user, the stored data could also be read by unauthorized persons, who would thereby gain access to the relevant accounts or cryptocurrencies.

The object of the invention is to avoid the disadvantages mentioned in the case of a generic jewelry ring and to reliably avoid unauthorized access to the stored data.

SUMMARY

The aforementioned object is achieved by a jewelry ring having the features of the appending claims. The RFID transponder is arranged on the inside of the metal base body, and the metal base body shields the RFID transponder closed to the outside, as a result of which a data transmission from the RFID transponder to a reading device arranged outside the ring and, vice versa, a transmission from a transmitting device arranged outside the ring to the RFID transponder can be completely blocked. As a result, it is possible to design the jewelry ring such that the RFID transponder can only be read from its inner side. As a result, the data stored on the RFID transponder are reliably secured against being read while the jewelry ring is being worn on the finger. In this case, not only a reading but also a manipulation of the data stored in the RFID transponder can be reliably prevented when the jewelry ring is being worn.

It is advantageous if the RFID transponder is accommodated in a transponder receptacle which is let into an inner side of the metal base body. As a result, a robust fastening and a secure shielding of the RFID transponder to the outside is possible. In this case, the transponder receptacle can already be provided during the manufacture of the jewelry ring or metal base body or alternatively can also be worked into an already existing jewelry ring, as required.

Advantageously, the transponder receptacle is formed by a hole. In this way, a particularly robust fastening and a particularly good shielding to the outside can be ensured. In addition, in this way the interior arrangement of the RFID transponder in a jewelry ring can be implemented in a relatively simple manner also subsequently.

In addition, it is advantageous if the transponder receptacle is configured in the shape of a groove, which allows the RFID transponder to be fastened in any circumferential position on the inside of the ring. In addition, the groove-shaped design of the transponder receptacle also allows at least one further RFID transponder to be accommodated, if necessary.

Advantageously, at least one further RFID transponder is accommodated on the inside of the metal base body. In this way, the region in which a reliable data transmission at the inside of the jewelry ring is possible can be increased in order to be able to read the stored data securely. In particular, the groove-shaped design of the transponder receptacle enables the fastening of at least one further RFID transponder on the inside or the circumferential arrangement of a transponder array. In this case, the readable data on the RFID transponders provided are advantageously stored redundantly, so that in the event of a lacking readability of a single RFID transponder the data concerned can be made available by the at least one further RFID transponder or the other RFID transponders of the transponder array.

In addition, it is advantageous if the at least one RFID transponder is designed as a passive transponder, so that it is available without its own power supply and thus almost indefinitely in terms of time. The passive RFID transponder can thereby be activated at any time by an electromagnetic field of an external reading device in order to transfer or make available the readable data.

It is also advantageous if the at least one RFID transponder has a near-field antenna integrated into a chip housing. Such antennas can be made available in a relatively small size, whereby they can be integrated into the jewelry ring in a particularly simple manner. In addition, the use of a near-field antenna which allows communication of the RFID transponder with a reading device only at a distance of at most 2 cm can effectively prevent the readable data being read by unauthorized third parties or being provided unintentionally.

In addition, it is advantageous if the RFID transponder is kept at a distance from the metal base body in a contactless manner, whereby interference-free data transmission can be ensured.

In a particularly advantageous embodiment, the RFID transponder is covered towards the fitting receptacle by a non-metallic material, which at least partially closes off the transponder receptacle. As a result, it is possible to accommodate the RFID transponder or its antenna structure at least largely invisibly and protected in the transponder receptacle without significant interference occurring during the reading of the stored data. The non-metallic materials can be used here as an additional structural element on the inside of the jewelry ring, so that the design and the overall impression of the quality of the jewelry ring can be preserved despite the at least one RFID transponder accommodated therein.

It is advantageous if the non-metallic material is formed at least partially by a carbon-fiber structure, a lacquer or a ceramic. As a result, the reduction of the transmitting and receiving power of the RFID transponders by the covering material can be limited to a minimum. In addition, the use of these materials makes it possible to provide particularly effective protection of the RFID transponders relative to mechanically or chemically acting stresses, which are caused, for example, by shocks, canting or penetrating fluids.

Alternatively or additionally, the non-metallic material can advantageously be formed at least partially by a gemstone which is formed from a crystalline or amorphous material. In particular, the gemstones can be formed by a monocrystalline material, in particular by zirconia. By using crystalline or amorphous stones or zirconia stones, the at least one RFID transponder can be covered and integrated particularly inconspicuously even in the case of high-quality jewelry objects, such as precious metal rings studded with precious stones.

Furthermore, the above-mentioned object is achieved by a reading arrangement with a jewelry ring in one of the above-described embodiments and a reading device for a data exchange with the RFID transponder of the jewelry ring, wherein the reading device has a reading area which can be inserted into the fitting receptacle and has receiving means for reading data from the RFID transponder. While the data stored on the RFID transponder are securely protected from unauthorized access due to the shielding to the outside and the limited range of the near-field antenna to the inside while the jewelry ring is being worn on the finger, the jewelry ring can be removed from the finger for reading the data and plugged onto the reading area of the reading device. In this reading area, the receiving means are arranged such that the at least one RFID transponder can be positioned sufficiently close to the receiving means in the plugged-on state of the jewelry ring in order to enable an undisturbed data transmission. In the case of a passive RFID transponder, an activation signal with an activation and reception frequency is transmitted to the jewelry object by activation means of the reading device, whereby an alternating electromagnetic field is generated. The frequency energy of this alternating electromagnetic field here serves as a power supply for the passive RFID chip during the communication process, during which the data stored thereon are transferred to the receiving means of the reading device.

In a further advantageous embodiment, the jewelry ring can be plugged onto the reading area in order to enable a secure positioning of the at least one RFID transponder relative to the activation means and the receiving means of the reading device.

Furthermore, it is advantageous if, in this case, a tapering section which is arranged before the reading area is provided in the plug-on direction in order to make it easier to plug onto the reading device.

Here, it is particularly preferred if an alignment arrangement is provided on the jewelry ring and the reading device, by means of which alignment arrangement the jewelry ring can be positioned at the reading area in a predetermined rotational position in which the RFID transponder is arranged adjacent to the receiving means of the reading area. The alignment arrangement can have, for example, alignment means which are formed by an inner contour and/or an outer contour of the jewelry ring or of its metal base body. These alignment means interact with corresponding, in particular complementary alignment counterpart means, which are formed on the reading device. These alignment means and alignment counterpart means are arranged in such a way that the jewelry ring is deflected away via a plug-on movement in such a way that it assumes a predetermined rotational position on the reading area when a final or stop position on the reading device is reached, in which rotational position the RFID transponder is arranged adjacent to the receiving means.

It is pointed out that all the above-described features of the subject-matter according to the invention are interchangeable or can be combined with one another, provided an exchange or a combination thereof is not ruled out for technical reasons.

BRIEF DESCRIPTION OF THE DRAWINGS

An exemplary embodiment of the invention is shown in the figures. In the figures:

FIG. 5 shows a perspective view of a reading arrangement with the jewelry ring and a reading device in the separated state, and FIG. 6 shows a perspective view of the reading arrangement in the plugged-together state.

DETAILED DESCRIPTION

Figure 1:
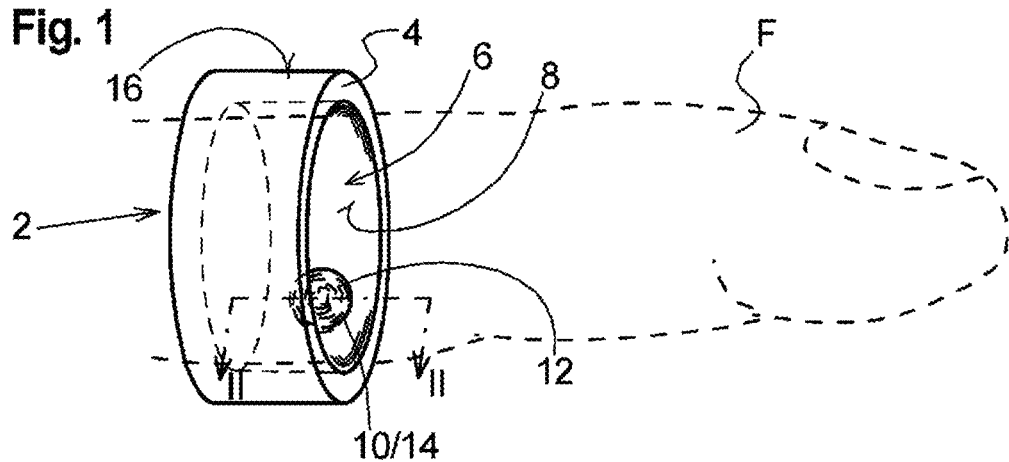
FIG. 1 shows a perspective view of a jewelry ring according to the invention with RFID transponder.

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments.

Generally, the following description and the corresponding figures disclose a jewelry ring (2), such as a jewelry finger ring which is worn in particular on the finger (F), where the jewelry ring has a metal base body (4), which forms a fitting receptacle (6), and an RFID transponder (12) in which readable data is stored and which has an antenna structure (22) via which signals can be transmitted to a reading device (32). It is provided here that the RFID transponder (12) is arranged on the inner side of the metal base body (4), and wherein the metal base body outwardly shields the RFID transponder.

Additionally, the following description and corresponding figures generally disclose a reading arrangement with the aforementioned jewelry ring (2) and a reading device for data exchange with the RFID transponder of the jewelry ring, wherein the reading device (32) comprises a reading area (34) with receiving means (36) for reading data from the RFID transponder (12), which reading area (34) can be inserted into the fitting receptacle (6).

Further, the following description and corresponding figures generally disclose a reading arrangement with a jewelry ring, specifically the aforementioned jewelry ring (2), wherein an alignment arrangement is provided on the jewelry ring (3) and on the reading device (32), by means of which alignment arrangement the jewelry ring (2) can be positioned at the reading area (34) in a predetermined rotational position in which the RFID transponder (12) is arranged adjacent to the receiving means (36) of the reading area (34).

Figure 2:
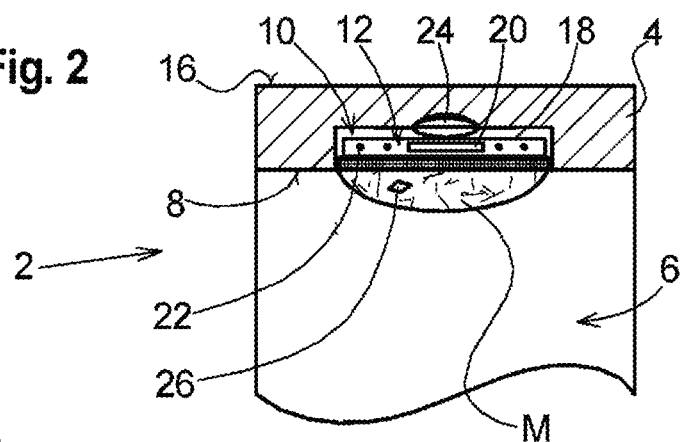
FIG. 2 shows a section through the jewelry ring according to FIG. 1 through plane II-II.

FIGS. 1 and 2 show a jewelry ring 2 in the form of a jewelry finger ring with a metal base body 4, which forms a fitting receptacle 6, by means of which the jewelry ring 2 can be put on a finger F. The metal base body 4 is formed in particular by precious metal, such as in particular by a gold, silver and/or platinum alloy.

On an inner side 8 delimiting the fitting receptacle 6, the metal base body 4 has a transponder receptacle 10 which serves for fastening an RFID transponder 12. The transponder receptacle 10 can, as shown, be formed by a hole 14 in the form of a blind hole let into the inner side 8. As a result, the RFID transponder 12 accommodated therein is shielded outwardly by a closed outer side 16 of the metal base body 4, e.g., a shielding portion 10a of metal base body 4 arranged between a surface of transponder receptable 10 proximate outer side 16 and outer side 16.

The RFID transponder 12 is here designed as a passive transponder with a chip housing 18 in which a memory chip 20 and an antenna structure 22 are accommodated. The memory chip 20 here serves to store data such as, in particular, identification or access data or codes, such as access codes for bank accounts or cryptocurrencies. The antenna structure 22 preferably forms a near-field antenna, the range of which extends exclusively into the fitting receptacle 6 and in this case is at most 2 cm.

As can be seen in particular from FIG. 2, the RFID transponder 12 is held in the transponder receptacle 10 at a distance from the metal base body 4, for example by means of an adhesive 24. In addition, the RFID transponder 12 is covered by a non-metallic material M towards the fitting receptacle 6, which non-metallic material closes off the transponder receptacle 10. In this case, the non-metallic material M can be formed at least in part by a carbon fiber structure, a lacquer or a ceramic. Alternatively or additionally, the non-metallic material M closing off the transponder receptacle can also be formed by a gemstone 26.

Figure 3:
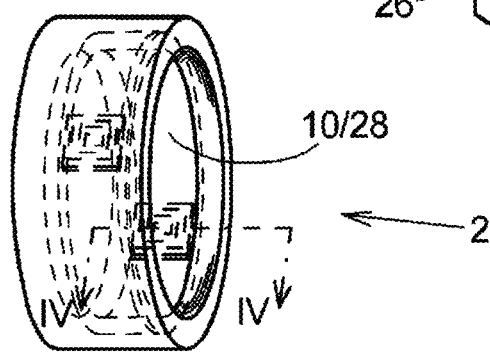
FIG. 3 shows a perspective view of an alternative embodiment of the jewelry ring.
Figure 4:
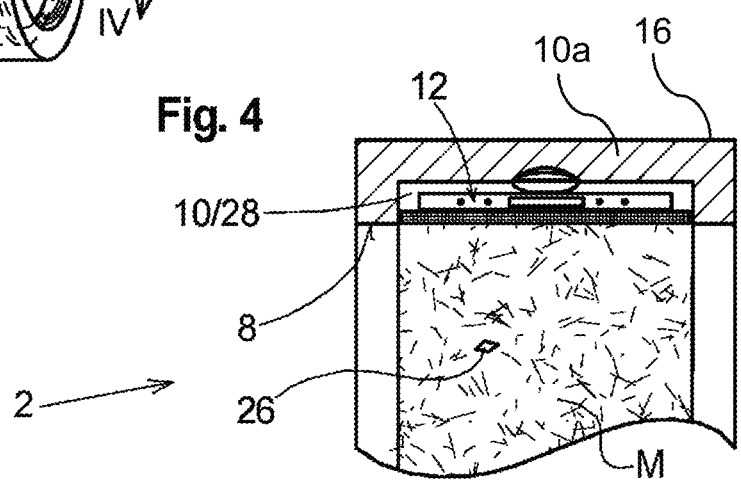
FIG. 4 shows a section through the jewelry ring according to FIG. 3 through plane IV-IV.

FIGS. 3 and 4 show an alternative embodiment of the jewelry ring 2, in which the transponder receptacle 10 is formed by a groove 28 which is let into the inner side 8, in particular a circumferential groove 28. This enables at least one further RFID transponder 12 or a transponder array, that is for example circumferentially arranged, to be accommodated. As an alternative to accommodating the at least two RFID transponders 12 in the common groove 28, two or more holes 14 can also be let into the inner side 8.

In this case, both the at least one hole 14 and the groove 28 can already be provided during the manufacture of the jewelry ring 2 or can also be introduced only subsequently into an existing jewelry ring 2, for example by drilling or milling.

FIGS. 5 and 6 show a reading arrangement 30 with the jewelry ring 2 and a reading device 32, which is provided for communicating with the RFID transponder 12.

In this case, the reading device 32 is shaped in one part such that the jewelry ring 2 can be plugged thereon along a plug-on direction R and into abutment with an end stop E which is formed adjacent to a reading area 34. In this reading area 34, receiving means 36 are accommodated, by means of which the RFID transponder 12 can be read.

In order to enable easier plugging-on of the jewelry ring 2 in the plug-on direction R, a tapering section 38, which is arranged upstream of the reading area, is additionally provided on the reading device 32.

In addition, alignment means 40, such as, for example, contour-forming regions on the outer side 16, can be provided on the jewelry ring 2, which in an intended rotational position of the jewelry ring 2 in relation to the reading device 32 can be brought into interaction with, for example, complementary alignment counterpart means 42. During the interaction of the alignment means 40 and alignment counterpart means 42, the jewelry ring 2 can be brought into a predetermined rotational position or held there when the end stop E is reached, in which position the at least one RFID transponder 12 is arranged adjacent to the receiving means 36, as shown in FIG. 6.

In this predetermined end stop position, an alternating electromagnetic field, which activates the RFID transponder 12, can now be generated via activation means 46 of the reading device 32, so that the data stored therein can be transferred to the adjacent receiving means 36 of the reading device 32. Via the reading device 32, the data can then be further used to grant the user the access concerned, such as to a bank account or to a cryptocurrency.

It is pointed out that all the above-described elements and features of the various embodiments of the subject-matter according to the invention are interchangeable or can be combined with one another, provided an exchange or a combination thereof is not ruled out for technical reasons.

The invention claimed is:

1. A jewelry ring, such as a jewelry finger ring worn in particular on the finger, comprising:
   a metal base body having an outer surface and an inner surface, the inner surface defining a fitting receptacle;
   a cavity arranged within the inner surface of the metal base body; and,
   an RFID transponder in which readable data is stored and which has an antenna structure via which signals can be transmitted to a reading device, wherein the RFID transponder is arranged within the cavity of the metal base body and proximate the fitting receptacle, wherein the metal base body outwardly shields the RFID transponder by a portion thereof arranged between the outer surface and the cavity; and,
   an alignment arrangement is provided on the jewelry ring and on the reading device, by means of which alignment arrangement the jewelry ring can be positioned at a reading area of the reading device in a predetermined rotational position in which the RFID transponder is arranged adjacent to receiving means of the reading area.

2. The jewelry ring according to claim 1, wherein the RFID transponder is accommodated in a transponder receptacle being defined by the cavity.

3. The jewelry ring according to claim 2, wherein the transponder receptacle is formed by a hole.

4. The jewelry ring according to claim 2, wherein the transponder receptacle is formed in the shape of a groove.

5. The jewelry ring according to claim 2, wherein the RFID transponder is covered towards the fitting receptacle by a non-metallic material, which at least partially closes off the transponder receptacle.

6. The jewelry ring according to claim 5, wherein the non-metallic material is formed at least partially by a carbon fiber structure, a lacquer or a ceramic.

7. The jewelry ring according to claim 5, wherein the non-metallic material is formed at least partially by a gemstone.

8. The jewelry ring according to claim 1, wherein at least one further RFID transponder is accommodated on the inner side of the metal base body.

9. The jewelry ring according to claim 1, wherein the at least one RFID transponder is designed as a passive transponder.

10. The jewelry ring according to claim 1, wherein the RFID transponder comprises a near-field antenna integrated into a chip housing.

11. The jewelry ring according to claim 1, wherein the RFID transponder is held in a contactless manner at a distance from the metal base body.

12. The jewelry ring according to claim 1, wherein the reading device is adapted for data exchange with the RFID transponder of the jewelry ring via the receiving means of the reading area, which reading area can be inserted into the fitting receptacle.

13. The jewelry ring according to claim 12, wherein the jewelry ring can be plugged onto the reading area.

14. The jewelry ring according to claim 13, wherein, in the plug-on direction, a tapering section is provided that is arranged before the reading area.

15. A reading arrangement with a jewelry ring, the jewelry ring comprising:
a metal base body which forms a fitting receptacle; and,
an RFID transponder in which readable data is stored and which has an antenna structure via which signals can be transmitted to a reading device, wherein the RFID transponder is arranged on the inside of the metal base body, wherein the metal base body outwardly shields the RFID transponder, wherein an alignment arrangement is provided on the jewelry ring and on the reading device, by means of which alignment arrangement the jewelry ring can be positioned at a reading area of the reading device in a predetermined rotational position in which the RFID transponder is arranged adjacent to receiving means of the reading area.

16. A reading arrangement with a jewelry ring, the jewelry ring, comprising:
a metal base body having an outer surface and an inner surface, the inner surface defining a fitting receptacle;
a cavity arranged within the inner surface of the metal base body; and,
an RFID transponder in which readable data is stored and which has an antenna structure via which signals can be transmitted to a reading device, wherein the RFID transponder is arranged within the cavity of the metal base body and proximate the fitting receptacle, wherein the metal base body outwardly shields the RFID transponder by a portion thereof arranged between the outer surface and the cavity, wherein the RFID transponder is accommodated in a transponder receptacle being defined by the cavity,
wherein an alignment arrangement is provided on the jewelry ring and on the reading device, by means of which alignment arrangement the jewelry ring can be positioned at the reading area in a predetermined rotational position in which the RFID transponder is arranged adjacent to the receiving means of the reading area.

17. The jewelry ring according to claim 16, wherein the transponder receptacle is formed by a hole.

18. The jewelry ring according to claim 16, wherein the transponder receptacle is formed in the shape of a groove.

19. The jewelry ring according to claim 16, wherein the RFID transponder is covered towards the fitting receptacle by a non-metallic material, which at least partially closes off the transponder receptacle.

* * * * *